Oct. 18, 1960     P. G. STEPHAN     2,956,682

FILTERING APPARATUS

Filed Feb. 20, 1958

INVENTOR
PAUL G. STEPHAN

BY *Herbert M. Wolfson*

ATTORNEY

United States Patent Office 2,956,682
Patented Oct. 18, 1960

2,956,682

FILTERING APPARATUS

Paul Glenn Stephan, Landenburg, Pa., assignor to E. I. du Pont de Nemours and Company, Wilmington, Del., a corporation of Delaware Filed Feb. 20, 1958, Ser. No. 716,477

4 Claims. (Cl. 210—291)

This invention relates to filtering apparatus and, more particularly, to a granular bed filter suitable for purifying liquids of high viscosity.

In granular bed filters heretofore in use, a bed of granular material rested on a metal screen or perforated plate, the plate separating an influent chamber from an effluent chamber. The flow of liquid through the bed was accomplished either by gravity flow or by applying pressure to the unfiltered liquid in the influent chamber. In the case of high viscosity liquids, substantial pressure was usually necessary to force the liquid to flow at any appreciable rate through the granular bed. However, such an arrangement, particularly under pressure, suffers from numerous difficulties and disadvantages. The mesh of the bed-supporting screen or its equivalent, the size of the perforations in the perforated plate, limits the minimum size of the particles used in the granular bed. Pressure applied to such an arrangement tends to cause channeling in the bed and consequently the passage of substantially unfiltered liquid through the bed. If channeling does not occur, then plugging of the screen or plate is apt to occur after a very short period.

The object of the present invention is a granular bed filter that avoids the aforementioned difficulties and disadvantages. A further object is to specify the details of a particularly effective granular bed filter suitable for the filtration of a viscose solution, the solution having a viscosity of 30-140 poises and being useful for the preparation of regenerated cellulose structures. Other objects will appear hereinafter.

The objects are accomplished by a filtering apparatus comprising, in brief, a bed of granular material suitable for filtering liquid; solid non-perforated means for supporting the bed; means for conveying unfiltered liquid to the bed; an outlet header disposed below the supporting means for conveying substantially filtered liquid; a plurality of conduits extending through the bed and disposed above and adjacent to, but spaced from the supporting means, the conduits adapted to convey liquid from said bed to said outlet header. The conduits, which may comprise a plurality of pipes extending through the bed, preferably contain a plurality of openings, slots or perforations on their underside adapted to receive liquid that has passed downwardly through the granular bed. The outlet header preferably contains a series of short pipe-like extensions from the top surface and communicating with the interior of the header, which extensions project through openings in the supporting plate and communicate at this extended end with the interior of each of the pipes disposed in the granular bed. Communication with the interior of these pipes is effected through an opening in each pipe, preferably centrally located in the underside of the pipes. The above arrangement is preferably enclosed within a vessel having a suitable inlet above the bed of granular material and the above-described outlet below the bed.

The invention will be more clearly understood by referring to the following description in conjunction with the drawings, in which.

Figure 1:
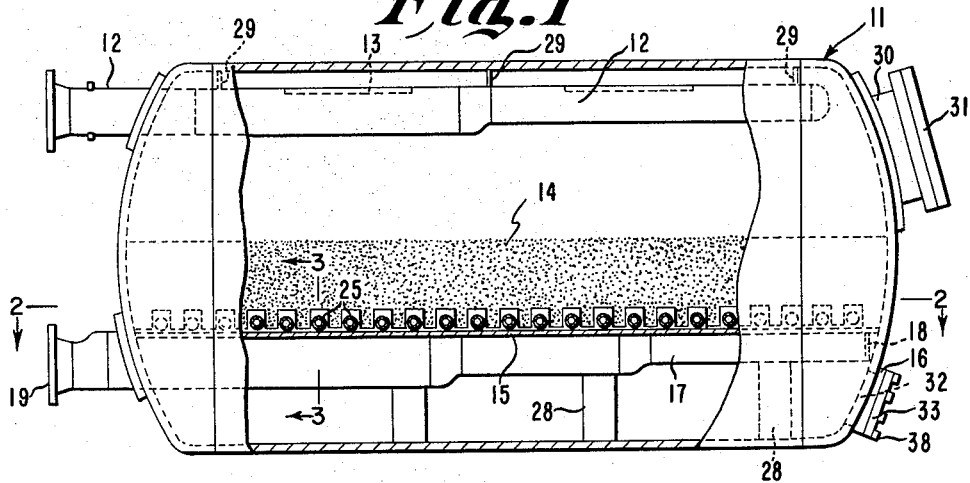
Figure 1 is an elevation of a preferred embodiment of the present invention.
Figure 2:
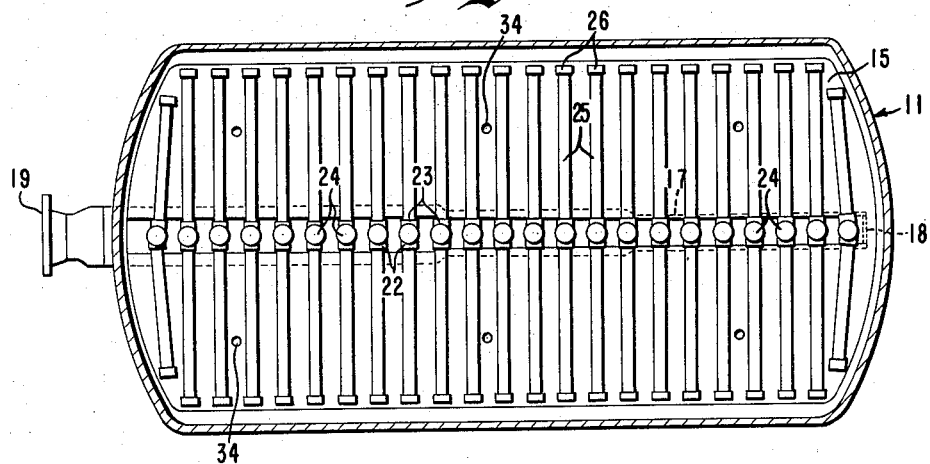
Figure 2 is a sectional view taken along line 2—2 of Figure 1.
Figure 3:
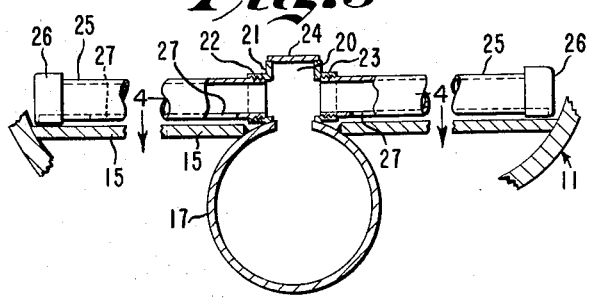
Figure 3 is a sectional view taken along line 3—3 of Figure 1.
Figure 4:
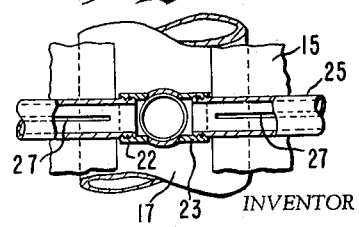
Figure 4 is a sectional view taken along line 4—4 of Figure 3.

As illustrated, the apparatus includes a cylindrical vessel 11 which may be about 6 feet in diameter and 11 feet long. The viscose or other liquid to be purified is supplied through an upper header 12, the header having a longitudinal slot 13 in the upper surface thereof. The slot 13 serves to distribute the incoming unfiltered liquid substantially uniformly over the granular bed filter below.

The granular bed filter comprises a bed of quartz particles 14 approximately 16 inches deep but which may have a depth of from 6 to 25 inches. The particles are supported on a solid, non-perforated plate 15 welded to the interior walls of the cylindrical vessel 11. The plate 15 is slotted along a straight line at its center, the slot being of such contour to accept an outlet header 17 within the slot. The header 17, in its position of projecting slightly through the slot, is welded to plate 15.

The lower outlet header 17 comprises a pipe of gradually increasing diameter from, as in the apparatus tested, 4 inches at the rear end, which end is enclosed by cap 18, to 10 inches at the outlet 19. Alternatively, header 17 may comprise a pipe of constant diameter with equally successful results. On the upper surface of the header 17 are cut a plurality of circular openings to which are welded specially threaded pipe fittings 20. Each fitting is composed of four parts welded together; namely, a pipe 21 having four circular openings, two half-couplings 22 and 23 welded to pipe 21 communicating with two of the openings and a plate 24 welded to pipe 21 covering the upper opening. The circular opening in the lower surface of each pipe 21 communicates with the openings in the upper surface of header 17. The header 17 is disposed below the plate 15 and the pipe fittings 20 welded to the header project above the plate 15 through the slot in the plate. The plate 15 is welded to the upper surface of the header 17 in the above-described position. Alternatively, gasketing or similar material may be used to effect a tight fit between the header 17 along with its projecting pipe fittings 20 and the plate 15. A solid plate may also be used with apertures, instead of a slot, cut therein, through which the pipe fittings 20 may protrude; or the plate may be in two sections so that when brought together the two sections describe a slot along the center or when brought together they may form the aforementioned apertures along the center line.

A plurality of conduits in the form of pipe laterals 25 of approximately 2 inches in diameter extend parallel to each other and through the bed of granular material 14 above plate 15. The pipe laterals are disposed in a direction transverse to the direction of the outlet header 17 and on either side of the fittings 20. At the extremity of each pipe lateral 25, i.e., the end adjacent to the interior wall of the cylindrical vessel 11, the pipe lateral is capped with a cap 26. At the other end of each pipe lateral 25 the lateral is threaded to the half-coupling 22 or 23 of the fitting 20. The aforementioned cap serves a dual purpose. Besides confining liquid in the pipe lateral, the cap, by being larger in diameter than the pipe lateral and by resting on the plate 15, serves to space the pipe lateral from the plate 15.

In the under surface of each pipe lateral 25 is a slot 27 to permit liquid which has passed downwardly through the granular bed 14 to pass upwardly through the slot 27 into the pipe laterals. Each cap 26 is similarly slotted. From the pipe laterals the filtered liquid flows through the fittings 20 into the outlet header 17 and then out of the vessel 11. Instead of slots machined longitudinally on the under surface of the pipe laterals as shown in the drawing, a series of slots machined crosswise or a slotted plate covering the pipe lateral or a slotted insert may be used. Perforations or screened coverings on the under surface may also be used. However, it is vital to the operation of the apparatus of the present invention that the liquid be made to flow upwardly into the pipe laterals by limiting whatever openings are used to the under surface of the pipe laterals.

Additional features are illustrated in the accompanying drawing. However, they are not critical to the operation of the filtering apparatus. For example, supports 28 have been provided for outlet header 17 and supports 29 welded to the top wall of vessel 11 have been provided for holding the inlet header 12 in place. Instead of supports 28, the space underneath the plate 15 may be filled with concrete and the header 17 may be placed therein. A manhole 30 with a suitable cover 31 has been provided for access to the upper interior portion of the vessel 11 for cleaning and other maintenance when necessary. An opening 32, to which is welded a reinforcing ring 16, the ring being drilled and tapped to receive bolts 38 which hold a blind flange 33 thereon may be provided in the lower portion of the vessel 11 for filling this lower portion of the vessel with concrete. Six air vents 34, each about ½ inch diameter, are provided in plate 15 to permit air escape when filling this lower portion with concrete.

In the application of the apparatus of the present invention to the filtration of viscose solution, it is advisable to use a vessel capable of withstanding pressures at least up to 600 p.s.i. Pressures of 250–600 p.s.i. have been found most useful in achieving reasonable flow rates over an optimum period of operation for the viscose solutions usually encountered in the manufacture of regenerated cellulose articles. In operation, the viscose is fed into the vessel by pumping means not shown in the present drawing. Air may be purged from the vessel by the use of a valve connected to a vent, not shown, and the desired pressure may then be applied.

The granular filter bed used for viscose has been found to operate most successfully when its depth is from 10 to 18 inches and it is composed of particles having a diameter of 0.25–0.7 millimeter. The particles used may be of any non-compressible material which is not appreciably reactive with viscose. Such materials include quartz, graded sands, iron, Monel or steel particles, certain inert polymeric particles, granular coke, pumice, coal, activated carbon, diatomaceous earth, ion-exchange minerals, zeolites and metal oxides.

Suitable valve arrangements for the inlet and outlet to permit periodic cleaning of the granular filter bed are usually provided. These arrangements permit backwashing in the conventional manner with any of the following fluids: air, water, steam, sodium hydroxide, muriatic acid, sulfuric acid, acetic acid, acetone, alcohols, carbon disulfide and the like. Backwashing of filtering apparatus used for viscose solutions is normally accomplished by first using a liquid and then using air as the backwashing fluids.

The materials used for constructing the filtering apparatus must be capable of withstanding the pressures to be used and, if they contact the liquid to be filtered, must be chemically resistant to these liquids. For filtering viscose solutions the materials of construction must be capable of resisting alkaline concentrations of at least 6%. Recommended materials include iron, steel, stainless steel and Monel metal.

It should be understood that the preceding description is illustrative only. Changes and variations may be made without departing from the spirit and scope of the invention as defined in the appended claims.

What is claimed is:

1. A filtering apparatus comprising a vessel having an inlet opening and an outlet opening; a solid plate intermediate said openings; a bed of granular material suitable for filtering liquids disposed on said plate; an outlet conduit disposed below said plate terminating in said outlet opening; a plurality of longitudinally spaced risers projecting from the top of said conduit through suitable openings in said plate; pipes disposed in said filter bed extending laterally from said risers, said pipes each containing a plurality of openings on their undersurfaces appreciably spaced above said plate whereby liquid is made to flow upwardly so that granular material is not swept into said pipes by the force of gravity.

2. A filtering apparatus as in claim 1 wherein said openings on the undersurfaces of the laterally extending pipes are in the form of lateral slots.

3. A filtering apparatus as in claim 1 wherein said openings on the undersurfaces of the laterally extending pipes are in the form of longitudinal slots.

4. A filtering apparatus as in claim 1 adapted for filtering viscose solution for the manufacture of regenerated cellulose articles wherein the granular filter bed is composed of inert particles having a diameter of 0.25–0.7 millimeter, said bed being 10–18 inches deep.

References Cited in the file of this patent
UNITED STATES PATENTS

| | | |
|---|---|---|
| 461,303 | Andrews | Oct. 13, 1891 |
| 514,531 | Williamson | Feb. 13, 1894 |
| 593,666 | Jewell | Nov. 16, 1897 |
| 1,405,406 | Genter | Feb. 7, 1922 |
| 1,997,114 | Martin | Apr. 9, 1935 |
| 2,528,065 | Lundberg | Oct. 31, 1950 |
| 2,816,664 | Haynes | Dec. 17, 1957 |